(12) United States Patent
Saiki

(10) Patent No.: US 8,038,758 B2
(45) Date of Patent: Oct. 18, 2011

(54) MAT MATERIAL AND EXHAUST GAS TREATMENT DEVICE

(75) Inventor: Kenzo Saiki, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 526 days.

(21) Appl. No.: 12/106,141

(22) Filed: Apr. 18, 2008

(65) Prior Publication Data

US 2009/0114097 A1     May 7, 2009

(30) Foreign Application Priority Data

Nov. 6, 2007 (JP) ................................. 2007-288831

(51) Int. Cl.
*B01D 46/00* (2006.01)
(52) U.S. Cl. ...................... 55/523; 55/DIG. 30; 422/177
(58) Field of Classification Search ...................... 55/502; 96/10
See application file for complete search history.

(56) References Cited

U.S. PATENT DOCUMENTS 6,911,189 B1 * 6/2005 Koller et al. ............... 423/245.1
2009/0049690 A1   2/2009 Eguchi

FOREIGN PATENT DOCUMENTS

| EP | 1296030 | 3/2003 |
|----|---------|--------|
| EP | 1696110 | 8/2006 |
| EP | 1772600 | 4/2007 |
| JP | 8-61054 | 3/1996 |
| JP | 2003-293756 | 10/2003 |
| WO | WO 0134892 | 5/2001 |
| WO | WO 2005105427 | 11/2005 |

OTHER PUBLICATIONS

Machine Translation of WO 01/34892.*
Machine Translation of JP 2006/334906.*

* cited by examiner

*Primary Examiner* — Duane Smith
*Assistant Examiner* — Tiffany N Palmer
(74) *Attorney, Agent, or Firm* — Ditthavong Mori & Steiner, P.C.

(57) ABSTRACT

A mat material includes an inorganic fiber, a first sheet material and a second sheet material. The first sheet material is provided on a first surface of the mat material. The second sheet material is provided on a second surface of the mat material. The first sheet material and the second sheet material show a different elongation amount in a longitudinal direction of the mat material under a same tensile load.

14 Claims, 14 Drawing Sheets

| | I-1 | I-2 | I-3 |
|---|---|---|---|
| $\theta_{dA}=90°$ | | | |
| DIRECTION OF PLACING SHEET MATERIAL | | | |
| $\theta_A$ | 0 | 45° | 90° |
| $\theta_A/\theta_{dA}$ | 0 | 0.5 | 1 |

| | II-1 | II-2 | II-3 |
|---|---|---|---|
| $\theta_{dA}=45°$ | | | |
| DIRECTION OF PLACING SHEET MATERIAL | | | |
| $\theta_A$ | 0 | 22.5° | 45° |
| $\theta_A/\theta_{dA}$ | 0 | 0.5 | 1 |

FIG.5

MAT MATERIAL AND EXHAUST GAS TREATMENT DEVICE

CROSS-REFERENCE TO RELATED APPLICATION

The present application claims priority under 35 U.S.C. §119 to Japanese Patent Application No. 2007-288831 filed on Nov. 6, 2007, with the Japan Patent Office, the entire contents of which are incorporated by reference herein.

BACKGROUND OF THE INVENTION

1. Field of the Invention

The present invention relates to mat materials and an exhaust gas treatment device.

2. Discussion of the Background

In proportion to the dramatic increase in the number of automobiles in the present century, the amount of exhaust gas from the internal combustion engines of the automobiles has also grown steadily. Particularly, various substances contained in the exhaust gas from diesel engines may cause pollution, thereby having a severe impact on the global environment.

Under such circumstances, various exhaust gas treatment devices have been proposed and put into practical use. Generally, exhaust gas treatment devices have a cylindrical member (casing) halfway through an exhaust pipe connected to an exhaust gas manifold of an engine and an exhaust gas treatment body having inlet and outlet opening surfaces for exhaust gas and forming a multiplicity of fine air holes inside the cylindrical member. Examples of the exhaust gas treatment body include a catalyst carrier and an exhaust gas filter such as a diesel particulate filter (DPF). With the above structure, the application of, e.g., the DPF permits fine particles to be trapped in the surrounding walls of air holes so that they are eliminated from exhaust gas, while the exhaust gas is exhausted from the outlet opening surface of the gas treatment body after entering through the inlet opening surface thereof.

Generally, a holding seal material is provided between the exhaust gas treatment body and the casing. The holding seal material is used to prevent breakage caused by a collision between the exhaust gas treatment body and the casing during vehicle operations and a leakage of exhaust gas from a gap between the casing and the exhaust gas treatment body. In addition, the holding seal material serves to prevent the dropping off of the exhaust gas treatment body due to the pressure of exhaust gas. Moreover, the exhaust gas treatment body is required to be held at high temperatures so as to maintain its reactivity, and the holding seal material is required to have a high heat insulation property as well. As a material satisfying these requirements, a mat material containing inorganic fibers such as alumina-based fibers is provided.

This mat material is wound around at least a part of an outer peripheral surface other than the opening surfaces of the exhaust gas treatment body and serves as the holding seal material by making its ends fitted or taped together so that the mat material is integrated with the exhaust gas treatment body. Then, the integrated product is press-fitted into the casing to thereby form the exhaust gas treatment device.

Note that the mat material contains a large amount of fine inorganic fibers and the inorganic fibers are exposed at the surface of the mat material. Such inorganic fibers may cause operating environments to be deteriorated. For example, at the time of handling the mat material, i.e., when an operator winds the mat material on the exhaust gas treatment body to manufacture the exhaust gas treatment device, these inorganic fibers are easily scattered to the surrounding area.

In order to alleviate the scattering problem of inorganic fibers at the time of handling the mat material, there has been proposed a mat material having resin films on its front and rear surfaces (see Japanese Patent Application Nos. 8-61054 and 2003-293756). The contents of Japanese Patent Application Nos. 8-61054 and 2003-293756 are incorporated herein by reference in their entirety.

SUMMARY OF THE INVENTION

According to one aspect of the present invention, a mat material includes an inorganic fiber, a first sheet material and a second sheet material. The first sheet material is provided on a first surface of the mat material. The second sheet material is provided on a second surface of the mat material. The first sheet material and the second sheet material show a different elongation amount in a longitudinal direction of the mat material under a same tensile load.

According to another aspect of the present invention, a mat material includes an inorganic fiber, a first sheet material and a second sheet material. The first sheet material is provided on a first surface of the mat material. The second sheet material is provided on a second surface of the mat material. The first and second sheet materials have elongation anisotropy in planes of the first and second surfaces, respectively. A relationship $\theta_A/\theta_{dA} < \theta_B/\theta_{dB}$ is satisfied between an angle $\theta_A$ (about $0 \leq \theta_A \leq \theta_{dA}$) formed by an easy-to-elongate direction in the first sheet material relative to a longitudinal direction of the mat material and an angle $\theta_B$ (about $0 \leq \theta_B \leq \theta_{dB}$) formed by an easy-to-elongate direction in the second sheet material relative to the longitudinal direction of the mat material. A direction in which a value at about a 5% nominal strain represented by (a tensile load (N)/a nominal strain) in the planes of the sheet materials becomes minimum is defined as the easy-to-elongate direction and a direction in which the value becomes maximum is defined as a hard-to-elongate direction. An angle formed by the easy-to-elongate direction and the hard-to-elongate direction in the first sheet material is $\theta_{dA}$ (about $0 < \theta_{dA} \leq$ about $90°$) and an angle formed by the easy-to-elongate direction and the hard-to-elongate direction in the second sheet material is $\theta_{dB}$ (about $0 < \theta_{dB} \leq$ about $90°$).

Preferably, in the mat material, a standardized angular difference $\theta_{dif}$ represented by $\theta_{dif} = (\theta_B/\theta_{dB}) - (\theta_A/\theta_{dA})$ is in the range of about $0.25 < \theta_{dif} \leq$ about $1$.

Furthermore, the angle $\theta_A$ in the first sheet material may be substantially about zero.

Furthermore, the angle $\theta_{dA}$ in the first sheet material may be about $90°$ or about $45°$.

Furthermore, the angle $\theta_{dA}$ in the first sheet material may be substantially equal to the angle $\theta_{dB}$ in the second sheet material.

Particularly, the first and second sheet materials may be same sheet materials.

Furthermore, the first sheet material may be placed on a substantially entire area of the first surface of the mat material, and/or the second sheet material may be placed on a substantially entire area of the second surface of the mat material At least one of the first and second sheet materials may be formed from at least one of polyethylene, polypropylene and polyethylene terephthalate.

The mat material may further include an inorganic binder and/or an organic binder.

According to still another aspect of the present invention, an exhaust gas treatment device includes an exhaust gas treatment body and a holding seal material. The exhaust gas treatment body has first and second opening surfaces through which exhaust gas passes. The holding seal material is wound around at least a part of an outer peripheral surface other than the first and second opening surfaces of the exhaust gas treatment body. The holding seal material has a mat material including an inorganic fiber; a first sheet material provided on a first surface of the mat material; and a second sheet material provided on a second surface of the mat material. The first and second sheet materials have elongation anisotropy in planes of the first and second surfaces, respectively. A relationship $\theta_A/\theta_{dA}<\theta_B/\theta_{dB}$ is satisfied between an angle $\theta_A$ (about $0 \leq \theta_A \leq \theta_{dA}$) formed by an easy-to-elongate direction in the first sheet material relative to a longitudinal direction of the mat material and an angle $\theta_B$ (about $0 \leq \theta_B \leq \theta_{dB}$) formed by an easy-to-elongate direction in the second sheet material relative to the longitudinal direction of the mat material. A direction in which a value at about a 5% nominal strain represented by (a tensile load (N)/a nominal strain) in the planes of the sheet materials becomes minimum is defined as the easy-to-elongate direction and a direction in which the value becomes maximum is defined as a hard-to-elongate direction. An angle formed by the easy-to-elongate direction and the hard-to-elongate direction in the first sheet material is $\theta_{dA}$ (about $0<\theta_{dA} \leq$ about 90°) and an angle formed by the easy-to-elongate direction and the hard-to-elongate direction in the second sheet material is $\theta_{dB}$ (about $0<\theta_{dB} \leq$ about 90°). The holding seal material is wound around the exhaust gas treatment body such that the second surface comes into contact with the outer peripheral surface of the exhaust gas treatment body.

Here, the exhaust gas treatment body may be a catalyst carrier or an exhaust gas filter.

According to an embodiment of the present invention, it is possible to provide a mat material having sheet materials, which improves its winding property and is capable of forming fitting parts with high positioning accuracy when it is wound. In addition, it is also possible to provide an exhaust gas treatment device having such a mat material as a holding seal material.

BRIEF DESCRIPTION OF THE DRAWINGS

Other objects, features and advantages of the present invention will become more apparent from the following detailed description when read in conjunction with the accompanying drawings, in which:

FIG. 5 is a diagram schematically showing typical arrangements for a first sheet material placed on a first surface of the mat material;

DETAILED DESCRIPTION OF THE EMBODIMENTS

Figure 1:
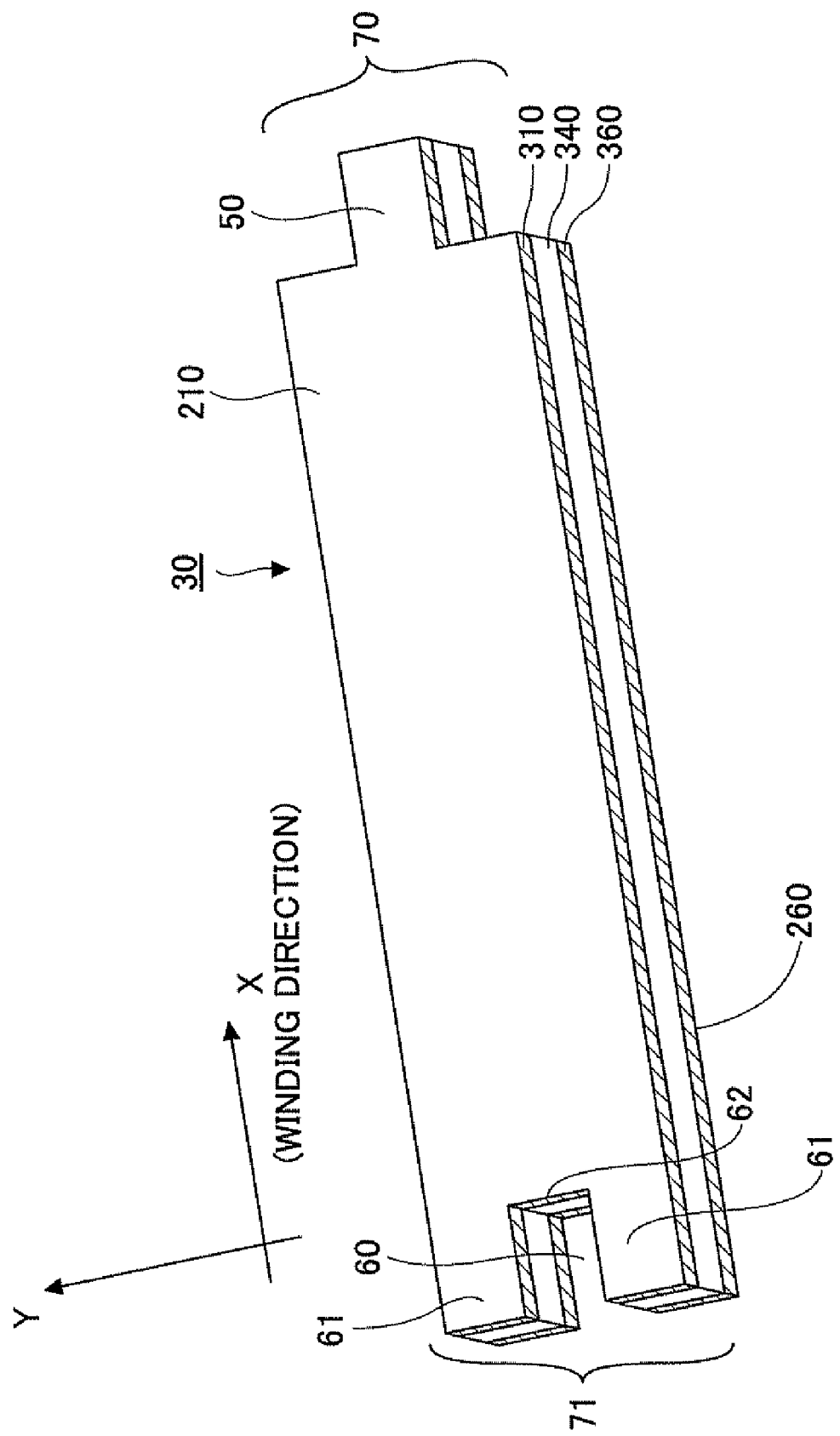
FIG. 1 shows an example of the shape of a mat material according to an embodiment of the present invention.

The embodiments will now be described with reference to the accompanying drawings, wherein like reference numerals designate corresponding or identical elements throughout the various drawings.

Figure 2:
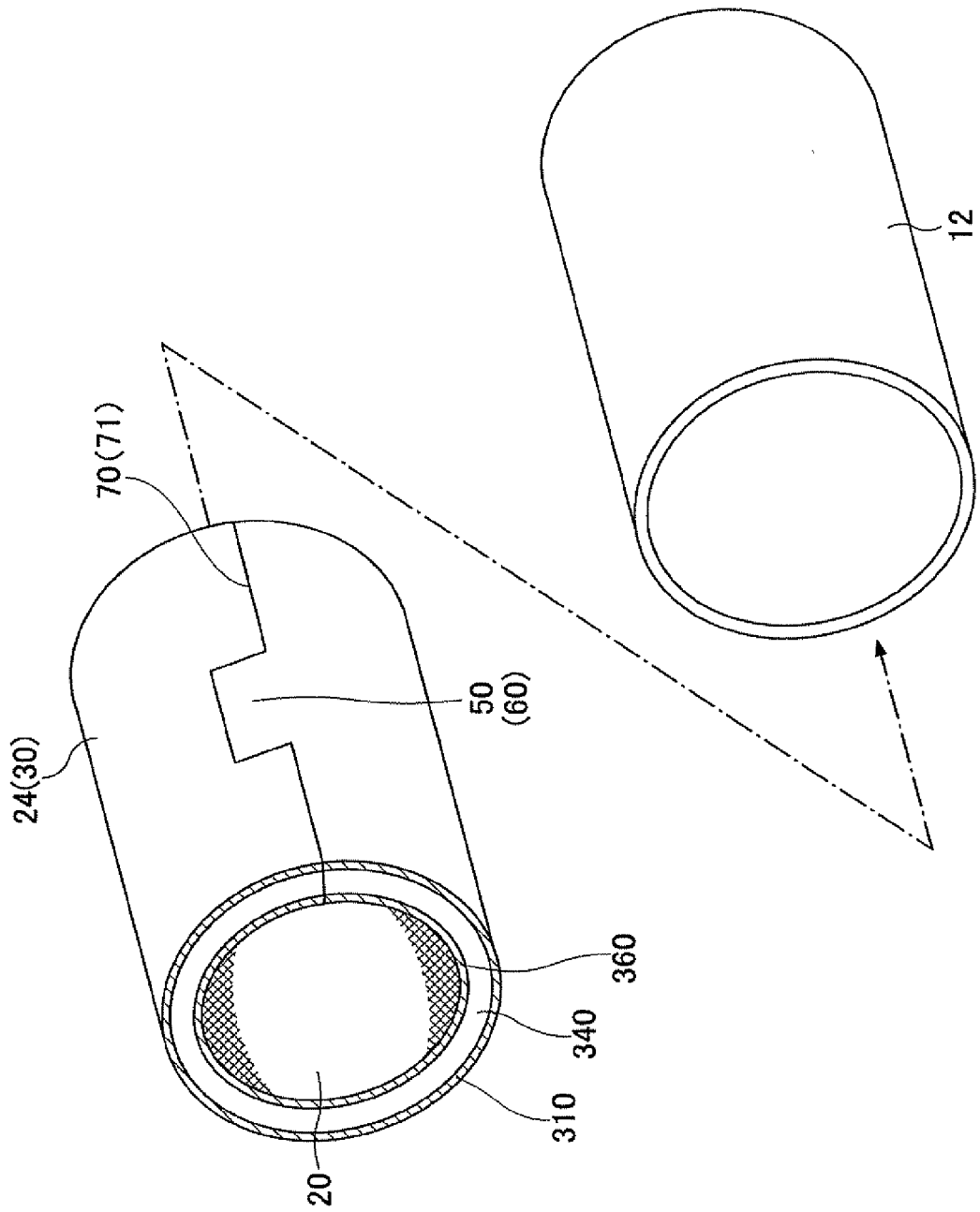
FIG. 2 is a diagram of an exhaust gas treatment device configured by using the mat material according to the embodiment of the present invention as a holding seal material.

FIG. 1 shows an example of the shape of a mat material according to an embodiment of the present invention. FIG. 2 shows an exploded configuration diagram of an exhaust gas treatment device including the mat material according to the embodiment of the present invention as a holding seal material.

As shown in FIG. 1, the mat material 30 according to the embodiment of the present invention has long sides (the sides parallel to X direction) and short sides (the sides parallel to Y direction) and is formed into a substantially rectangular shape. The short sides 70 and 71 have a fitting convex part 50 and a fitting concave part 60, respectively. Furthermore, two convex parts 61 are formed at the positions adjacent to the fitting concave part 60 of the short side 71. However, the shape of the short sides 70 and 71 of the sheet material according to the embodiment of the present invention is not limited to the shape of FIG. 1. For example, the sheet material may be formed such that it does not have the fitting parts as shown in FIG. 1 at all or has plural pieces of the fitting convex parts 50 and the fitting concave parts 60 on the respective short sides. Note that the "substantially rectangular shape" in the present invention refers to a conception that includes a rectangle having the fitting convex part 50 and the fitting concave part 60 which are respectively formed on the short sides. Moreover, it refers also to a shape in which the corner where the long side and the short side intersect has an angle other than about 90° (e.g., the shape having a curvature).

Furthermore, the mat material 30 has a mat base 340 containing a multiplicity of inorganic fibers, and first and second sheet materials 310 and 360 are placed on a first surface 210 (that also serves as a first surface of the mat material 30) and a second surface 260 (that also serves as a second surface) of the mat base 340, respectively. Generally, the mat base 340 contains a large amount of fine inorganic fibers (typically having a diameter of about 3 μm through 8 μm). However, the mat material 30 according to the embodiment of the present invention has the first and second sheet materials 310 and 360 on the first and second surfaces 210 and 260, respectively. Therefore, the mat material 30 can significantly reduce the scattering of inorganic fibers from the surfaces 210 and 260 when it is handled.

When the mat material 30 is used as the holding seal material 24 for the exhaust gas treatment device, it is wound in its long side direction as a winding direction (X direction). Furthermore, when the mat material 30 is wound around an exhaust gas treatment body 20 such as a catalyst carrier as the holding seal material, the fitting convex part 50 and the fitting concave part 60 of the mat material 30 are fitted together as shown in FIG. 2 so that the mat material 30 is fixed to the exhaust gas treatment body 20. Then, the exhaust gas treatment body 20 on which the holding seal material 24 is wound is press-fitted by press fitting and attached in a cylindrical casing 12 made of metals or the like.

Referring back to FIG. 1, each of the first and second sheet materials of the mat material 30 according to an embodiment of the present invention is made of an "elongation anisotropy sheet material." In the embodiment of the present invention, the important point to note is that the term of an "elongation anisotropy sheet material" or a "sheet material having elongation anisotropy" refers to a sheet material having elongation anisotropy in a plane, i.e., a sheet material having a difference of about 10% or larger in an elongation value (at a 5% nominal strain) between an "easy-to-elongate direction" $D_{max}$ and a "hard-to-elongate direction" $D_{min}$ in a plane. Furthermore, the "easy-to-elongate direction" $D_{max}$ refers to a direction in which the value (at about a 5% nominal strain) represented by (a tensile load (N)/a nominal strain) becomes minimum in the plane of a sheet material, and the "hard-to-elongate direction" $D_{min}$ refers to a direction in which the value (at about a 5% nominal strain) represented by (a tensile load (N)/a nominal strain) becomes maximum in the plane of a sheet material.

Note that the "easy-to-elongate direction" $D_{max}$ and the "hard-to-elongate direction" $D_{min}$ can be determined by measuring the value of a tensile load at about a 5% nominal strain obtained when a sheet material is independently pulled from its both end sides, while changing angles from about 0° through about 180°. For example, when the tensile load F(N) is applied to the direction of the length $L_0$ of a sheet material (having the length "$L_0$," the width "$W_0$," and the thickness "$t_0$") and the sheet material is pulled from its both end sides, the sheet material is elongated in the pulling direction. Then, assume that the length of the sheet material after elongated is defined as $L_1$, the value $\{F(N)/((L_1-L_0)/L_0)\}$ when the sheet material is elongated up to about a 5% nominal strain (obtained by $(L_1-L_0)/L_0$) is measured. This measurement is performed by changing the pulling direction from about 0° through about 180° at an interval of, e.g., 1°. As a result, the "easy-to-elongate direction" $D_{max}$ and the "hard-to-elongate direction" $D_{min}$ in the plane of the sheet material can be determined.

Here, an angle $\theta_d$ formed by the easy-to-elongate direction ($D_{max}$) and the hard-to-elongate direction ($D_{min}$) may take any value, provided that the first and second sheet materials 310 and 360 used in the mat material according to the embodiment of the present invention have elongation anisotropy in their planes. In the embodiment of the present invention, however, the angle $\theta_d$ is defined as about 0°<$\theta_d$≦about 90° ($\theta_d$=0° corresponds to a sheet material having no anisotropy). Furthermore, if there are plural of the easy-to-elongate directions ($D_{max}$) or the hard-to-elongate directions ($D_{min}$) in the range of 0°<$\theta_d$≦about 90°, the angle $\theta_d$ is defined as the minimum angle from among those formed by the easy-to-elongate directions ($D_{max}$) and the hard-to-elongate directions ($D_{min}$).

Figure 3:
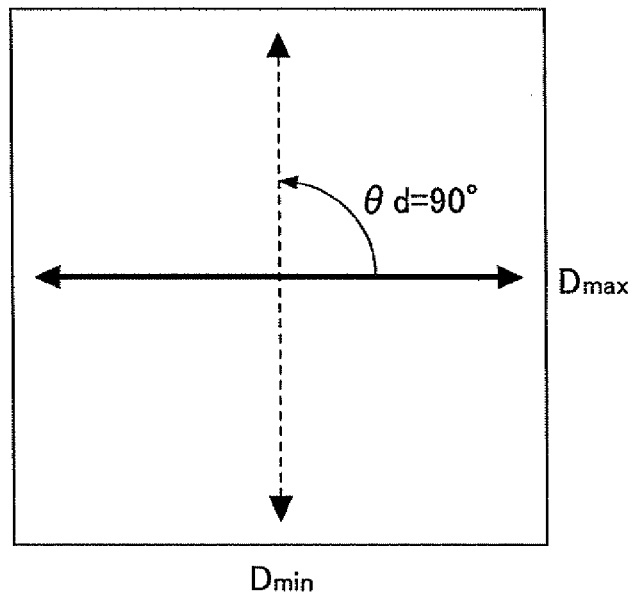
FIG. 3 is a diagram showing a sheet material in which an angle $\theta_d$ formed by an easy-to-elongate direction $D_{max}$ and a hard-to-elongate direction $D_{min}$ is 90°.
Figure 4:
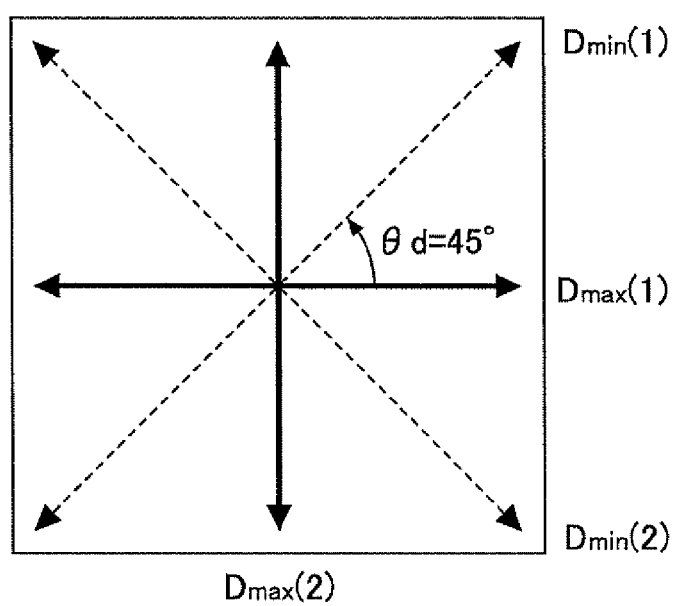
FIG. 4 is a diagram showing a sheet material in which an angle $\theta_d$ formed by the easy-to-elongate direction $D_{max}$ and the hard-to-elongate direction $D_{min}$ is 45°.

FIGS. 3 and 4 are diagrams schematically showing a relationship between the easy-to-elongate direction and the hard-to-elongate direction in the elongation anisotropy sheet material that may be used in the embodiment of the present invention.

FIG. 3 shows a sheet material in which the angle $\theta_d$ formed by the easy-to-elongate direction $D_{max}$ (the direction indicated by a bold line) and the hard-to-elongate direction $D_{min}$ (the direction indicated by a dotted line) is 90°. In this case, there are one easy-to-elongate direction $D_{max}$ and hard-to-elongate direction $D_{min}$ in the plane.

On the other hand, FIG. 4 shows a sheet material in which the angle $\theta_d$ formed by the easy-to-elongate direction $D_{max}$ (the direction indicated by a bold line) and the hard-to-elongate direction $D_{min}$ (the direction indicated by a dotted line) is about 45°. Accordingly, in the case of the sheet material of FIG. 4, there are two easy-to-elongate directions $D_{max}$ and hard-to-elongate directions $D_{min}$ in two directions in the plane. Although not shown in the figures, it may be possible to use sheet materials in which the angle $\theta_d$ formed by the easy-to-elongate direction $D_{max}$ and the hard-to-elongate direction $D_{min}$ is, e.g., about 30° or about 15°. In the case of these sheet materials, there are three easy-to-elongate directions $D_{max}$ and six hard-to-elongate directions $D_{min}$ in the plane.

Furthermore, where an angle formed by the easy-to-elongate direction in the first sheet material 310 relative to the longitudinal direction (X direction in FIG. 1) of the mat material 30 is $\theta_A$ and an angle formed by the easy-to-elongate direction in the second sheet material 360 relative to the longitudinal direction of the mat material 30 is $\theta_B$, the mat material 30 according to the embodiment of the present invention establishes the relationship $\theta_A/\theta_{dA}<\theta_B/\theta_{dB}$. Note that $\theta_{dA}$ is an angle formed by the easy-to-elongate direction $D_{max}$ and the hard-to-elongate direction $D_{min}$ in the first sheet material and $\theta_{dB}$ is an angle formed by the easy-to-elongate direction $D_{max}$ and the hard-to-elongate direction $D_{min}$ in the second sheet material. Furthermore, the relationships about 0°≦$\theta_A$≦$\theta_{dA}$ and about 0°≦$\theta_B$≦$\theta_{dB}$ are established. In the embodiment of the present invention, the important point to note is that the term "longitudinal direction" of the mat material is not applied only to the mat material having the substantially rectangular shape. For example, in the case of a mat material having a substantially square shape, a direction along either side refers to the longitudinal direction of the mat material.

Here, a description is more specifically made of the easy-to-elongate direction $D_{max}$ of a sheet material, the hard-to-elongate direction $D_{min}$ thereof, and the angle $\theta_d$ (i.e., $\theta_{dA}$ and $\theta_{dB}$) formed by the easy-to-elongate direction $D_{max}$ and the hard-to-elongate direction $D_{min}$. FIG. 5 is a diagram showing the relationship between the above parameters in the first sheet material. However, the important point to note is that same applies to the second sheet material by changing the symbols from $\theta_A$ and $\theta_{dA}$ to $\theta_B$ and $\theta_{dB}$, respectively, in the figure.

When the elongation anisotropy sheet material having $\theta_{dA}$=90° is used as the first sheet material, the angle $\theta_A$ in the first sheet material is changed, for example, from I-1 through I-3 as shown in FIG. 5 depending on which direction the first sheet material is placed on the surface of the mat material. In other words, if the easy-to-elongate direction $D_{max}$ in the first sheet material is parallel to the longitudinal direction of the mat material, $\theta_A$=about 0 and $\theta_A/\theta_{dA}$=about 0 are provided (state I-1). Furthermore, if the angle formed by the easy-to-elongate direction $D_{max}$ in the first sheet material relative to the longitudinal direction of the mat material is about 45°, $\theta_A$=about 45° and $\theta_A/\theta_{dA}$=about 0.5 are provided (state I-2). Moreover, if the hard-to-elongate direction $D_{min}$ in the first sheet material is parallel to the longitudinal direction of the mat material, $\theta_A$=about 90° and $\theta_A/\theta_{dA}$=about 1 are provided (state I-3).

Similarly, when the elongation anisotropy sheet material having $\theta_{dA}$=about 45° is used as the first sheet material, the angle $\theta_A$ in the first sheet material is changed, for example, from states III-1 through II-3 as shown in FIG. 5 depending on which direction the first sheet material is placed on the surface of the mat material. In other words, if one of the easy-to-elongate directions $D_{max}$ in the first sheet material is parallel to the longitudinal direction of the mat material, $\theta_A$=about 0 and $\theta_A/\theta_{dA}$=about 0 are provided (state II-1). Furthermore, if the angle formed by one of the easy-to-elongate directions $D_{max}$ in the first sheet material relative to the longitudinal direction of the mat material is about 22.5°, $\theta_A$=about 22.5° and $\theta_A/\theta_{dA}$=about 0.5 are provided (state II-2). Moreover, if one of the hard-to-elongate directions $D_{min}$ in the first sheet material is parallel to the longitudinal direction of the mat material, $\theta_A$=about 45° and $\theta_A/\theta_{dA}$=about 1 are provided (state II-3).

Accordingly, the positional relationship $\theta_A/\theta_{dA}<\theta_B/\theta_{dB}$ in FIG. 5 represents that if the first sheet material is placed on the surface of the mat material in the I-1 state, the second sheet material is placed on the second surface of the mat material in the I-2, I-3, II-2, or II-3 state. Furthermore, if the first sheet material is placed on the first surface of the mat material in the I-2 state, the second sheet material is placed on the second surface of the mat material in the I-3 state. Moreover, if the first sheet material is placed on the first surface of the mat material in the II-2 state, the second sheet material is placed on the second surface of the mat material in the I-2, I-3, or II-3 state. Note, however, that the above description is an example for facilitating the understanding of the configuration of the embodiment of the present invention, and it is apparent that various arrangements can be made other than the exemplified ones of the sheet material.

Now, if a conventional mat material having sheet materials with no elongation anisotropy on its first and second surfaces is handled, the following problems may be caused.

(1) Generally, a resin film used as the sheet material has uniform elasticity in all directions. Furthermore, when a tensile force is applied to the winding direction of the mat material so as to wind onto an exhaust gas treatment body the mat material having such sheet materials on its front and rear surfaces, a resisting force (restoring force) corresponding to the tensile force occurs in the direction opposite to the winding direction. Due to this resisting forcer the winding property (winding easiness) of the mat material having the sheet materials on its both surfaces is more degraded than that of the mat material having no sheet material.

(2) When the mat material is wound around the exhaust gas treatment body, a circumferential length difference generally occurs between outer and inner peripheral surfaces of the mat material due to the thickness of the mat material. In the conventional mat material having the sheet materials on its front and rear surfaces, however, a uniform elongation is likely to be generated on the sides of the outer and inner peripheral surfaces when the tensile force is applied. Therefore, it is difficult to reduce such a circumferential length difference in the whole mat material. Accordingly, in the mat material having been wound around the exhaust gas treatment body, the fitting convex part 50 and the fitting concave part 60 in a fitting part are caused to be overlapped with each other more than necessary or cannot be fitted together properly. Accordingly, in the conventional mat material having the sheet material with uniform elasticity in all directions on its both surfaces, it is difficult to form the fitting part with high accuracy.

Conversely, the mat material according to the embodiment of the present invention includes the sheet material having elongation anisotropy in a plane as the first and second sheet materials 310 and 360. As an example shown in FIG. 1, on the first surface 210 is placed the sheet material 310 in which the angle $\theta_{dA}$ formed by the easy-to-elongate direction ($D_{max}$) and the hard-to-elongate direction ($D_{min}$) is about 90°. Similarly, on the second surface 260 is placed the sheet material 360 in which the angle $\theta_{dB}$ formed by the easy-to-elongate direction ($D_{max}$) and the hard-to-elongate direction ($D_{min}$) is about 90°. Moreover, in the mat material according to the embodiment of the present invention, the relationship $\theta_A/\theta_{dA}<\theta_B/\theta_{dB}$ is established. For example, the case of FIG. 1 provides substantially $\theta_A$=about 0° and $\theta_B$ about 90°. Accordingly, the mat material according to the embodiment of the present invention can provide the significant effects as follows.

Figure 6:
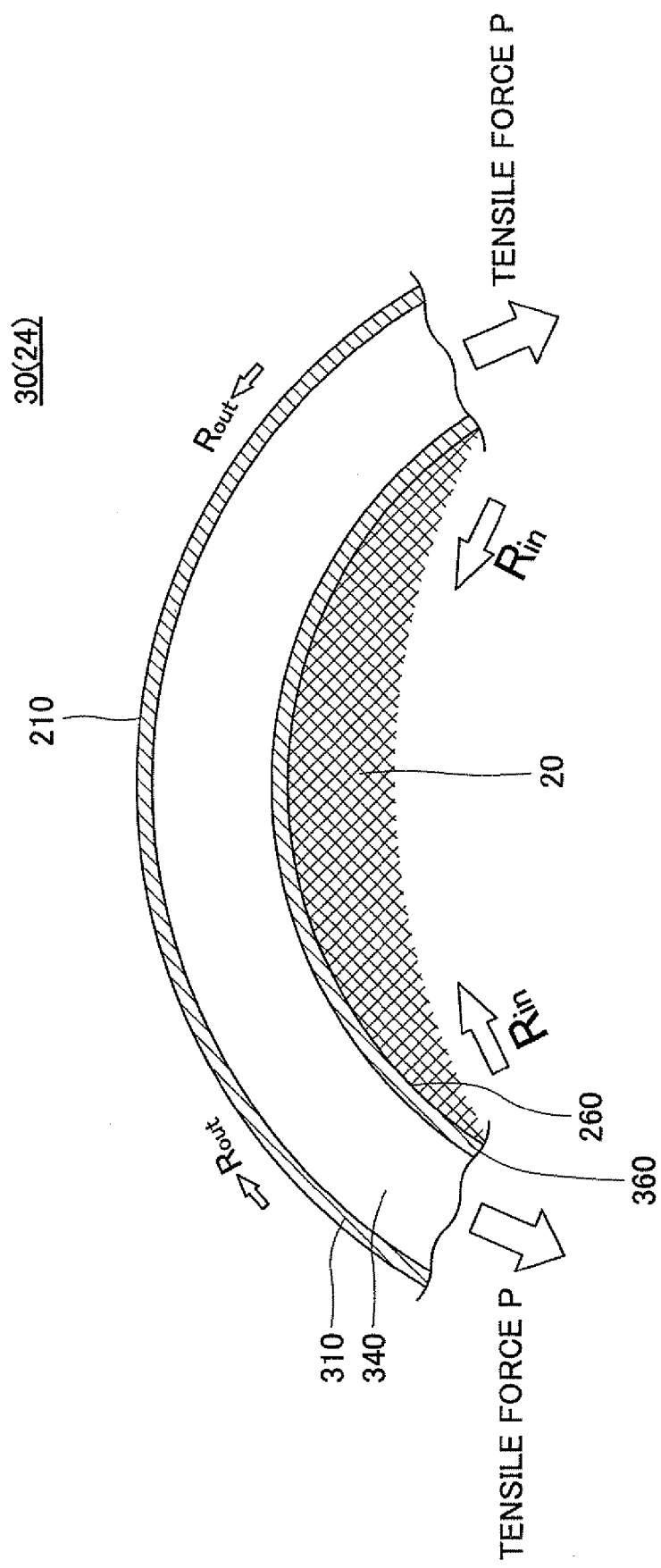
FIG. 6 is a diagram schematically showing a resisting force occurring on the first and second surfaces of the mat material when the mat material according to the embodiment of the present invention is wound around the exhaust gas treatment body.

FIG. 6 is a diagram showing the characteristics generated when the mat material according to the embodiment of the present invention is used as the holding seal material. More specifically, FIG. 6 shows the case of a resisting force (restoring force) occurring on the sides of the first and second surfaces 210 and 260 when a tensile force is applied in the longitudinal direction (X direction in FIG. 1) of the mat material 30 and the mat material 30 is wound around the exhaust gas treatment body 20.

In the case of the mat material according to the embodiment of the present invention in which the elongation anisotropy sheet materials 310 and 360 are placed on the first and second surfaces 210 and 260 of the mat base 340, respectively, under the relationship $\theta_A/\theta_{dA}<\theta_B/\theta_{dB}$, an actual winding direction of the mat material 30 is relatively close to the easy-to-elongate direction in the first sheet material 310 on the first surface 210. On the second surface 260, on the other hand, an actual winding direction of the mat material 30 is much different from the easy-to-elongate direction in the second sheet material 360. Accordingly, when the mat material 30 is used as the holding seal material 24 and wound around the exhaust gas treatment body 20 with the first surface 210 positioned on the outer peripheral side of the holding seal material 24, a resisting force (restoring force) $R_{out}$ occurring on the outer peripheral surface side of the mat material 30 in accordance with a tensile force R becomes smaller than a resisting force (restoring force) $R_{in}$, occurring on the inner peripheral surface side thereof, even if a uniform tensile force P is applied to the mat material 30. Accordingly, an operator is allowed to wind the mat material onto the exhaust gas treatment body 20 relatively easily, thereby making it possible to improve the winding property relative to the exhaust gas treatment body 20 of the mat material compared with the conventional mat material having the sheet materials with no anisotropy on its both surfaces.

In connection with this, in the holding seal material 24 using the mat material 30 according to the embodiment of the present invention, the elongation property in the winding direction is made different between the side where the first sheet material 310 is placed and that where the second sheet material 360 is placed. In other words, the first surface 210 is more easily elongated relative to the winding direction than the second surface 260 (i.e., the first surface 210 shows a larger elongation amount than the second surface 260 when they are compared with each other under a uniform tensile force). Therefore, when the mat material 30 is wound around the exhaust gas treatment body 20 with the first surface 210 as the outer peripheral surface of the holding seal material 24, the outer peripheral surface is more easily elongated than the inner peripheral surface while the inner peripheral surface is less easily elongated than the outer peripheral surface, even if a uniform tensile force is applied to the mat material 30. Accordingly, an operator is allowed to significantly alleviate the influence of a circumferential length difference of the holding seal material 24 without performing a special procedure when he or she winds the mat material 30 onto the exhaust gas treatment body 20. Moreover, the mat material 30 can be more stably wound around the exhaust gas treatment body 20, thereby making it possible to improve positioning accuracy of the fitting parts.

When a "standardized angular difference" $\theta_{dif}$ is defined using $\theta_A$ (the angle formed by the easy-to-elongate direction in the first sheet material relative to the longitudinal direction of the mat material 30), $\theta_B$ (the angle formed by the easy-to elongate direction in the second sheet material relative to the longitudinal direction of the mat material 30), $\theta_{dA}$ (the angle formed by the easy-to-elongate direction and the hard-to-elongate direction in the first sheet material), and $\theta_{dB}$ (the angle formed by the easy-to-elongate direction and the hard-to-elongate direction in the second sheet material), the equation $$\theta_{dif} = (\theta_B/\theta_{dB}) - (\theta_A/\theta_{dA}) \quad (1)$$

is provided. Here, the angular difference $\theta_{dif}$ is preferably in the range of about $0.25 < \theta_{dif} \leq$ about 1. In this case, the fitting accuracy of the fitting parts of the mat material is further improved, thereby making it possible to provide an exhaust gas treatment device with high reliability. The angular difference $\theta_{dif}$ is particularly preferably in the range of about $0.5 \leq \theta_{dif} \leq$ about 1.

In addition to or separate from this, the angle $\theta_A$ formed by the easy-to-elongate direction of the first elongation anisotropy sheet 310 is preferably as close to about 0° (zero) as possible relative to the longitudinal direction of the mat material 30. Particularly, in the case of substantially $\theta_A$=about 0°, the bending strength of the first surface in the mat material becomes minimum, thereby further improving the winding property of the mat material.

The substance of the first and second elongation anisotropy sheet materials 310 and 360 for use in the mat material 30 according to the embodiment of the present invention is not particularly limited, and any type of sheet material may be used so long as it has the above-described characteristics. Examples of the sheet material include papers, plastics, nonwovens, and materials made of a thin paper, each showing elongation anisotropy in a plane.

Particularly, the elongation anisotropy sheet material is preferably made of polymer materials. The type of the polymer materials is not particularly limited, but it is preferable to use thermally fusible materials such as polyethylene, polypropylene, and polyethylene terephthalate. In this case, the sheet materials can be fixed to the front and rear surfaces of the mat material after being heated without the use of an adhesive. Accordingly, it is possible to improve operability and reduce the exhaust amount of organic constituents.

Examples of the sheet material having elongation anisotropy in a plane for use in the embodiment of the present invention include, e.g., nonwovens (Eltas (Trade Mark) and Smash (Trade Mark)) manufactured by ASAHI KASEI FIBERS CORPORATION and CLAF (Trade Mark) manufactured by NISSEKI PLASTO Co., LTD.

Furthermore, the thickness of the sheet material having elongation anisotropy for use in the embodiment of the present invention is not particularly limited and is, e.g., in the range of about 1 μm through 1 mm.

Figure 7:
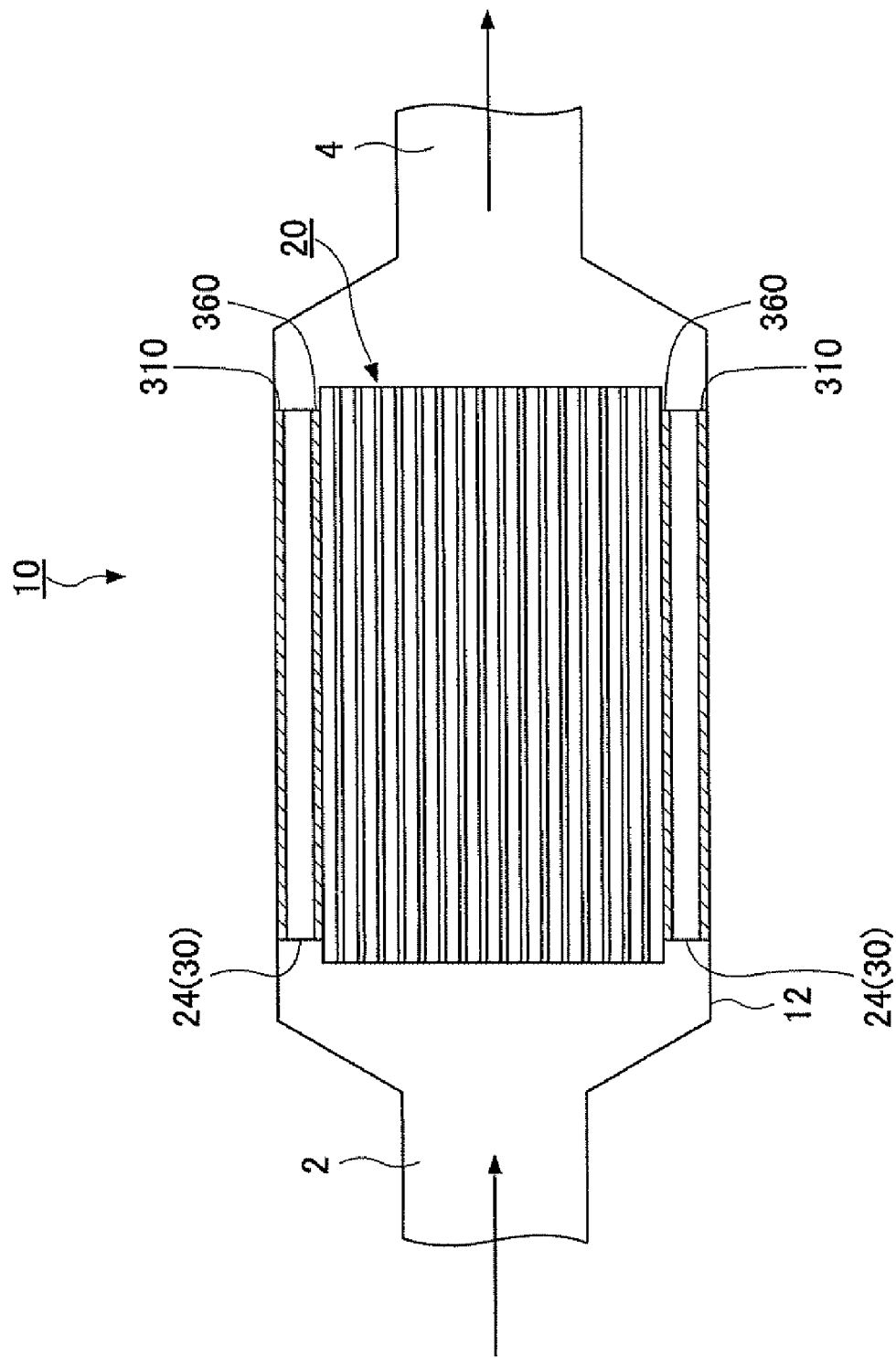
FIG. 7 is a diagram showing a configuration example of the exhaust gas treatment device according to an embodiment of the present invention.

FIG. 7 shows a configuration example of the exhaust gas treatment device 10 that uses such a mat material as the holding seal material. In the example of FIG. 7, the exhaust gas treatment body 20 is a catalyst carrier having inlet and outlet opening surfaces for exhaust gas and a multiplicity of through-holes in the direction parallel to a gas stream. The catalyst carrier is made, e.g., of honeycomb-shaped polymeric silicon carbide. Note, however, that the exhaust gas treatment device 10 according to the embodiment of the present invention is not limited to this configuration. For example, the exhaust gas treatment body 20 may also be in the form of a DPF in which a part of through-holes is sealed.

When the mat material according to the embodiment of the present invention is used as the holding seal material for the exhaust gas treatment body 10, it is wound around the exhaust gas treatment body 20 with the first surface 210 (i.e., the first sheet material 310) positioned on the outer peripheral side and the second surface 260 (i.e., the second sheet material 360) positioned on the inner peripheral side. With such an exhaust gas treatment device, the scattering of inorganic fibers is significantly reduced and the winding property of the mat material 30 is improved due to the above-described effects when the mat material 30 is wound around the exhaust gas treatment body 20 as the holding seal material 24. In addition, the positioning accuracy of the fitting part is improved, thereby making it possible to provide the exhaust gas treatment device 10 with high reliability.

Next, a description is made of an example of a manufacturing method for the mat material 30 according to the embodiment of the present invention.

First, a laminate sheet made of inorganic fibers is manufactured. Note that a mixture of alumina and silica is used as inorganic fibers in the following description. However, the inorganic fibers are not limited to this and may be made, e.g., of only alumina or silica. In order to prepare precursors of the inorganic fibers, silica sol is added to a basic aluminum chloride aqueous solution with an aluminum content of 70 g/l and Al/Cl=about 1.8 (atom ratio) so that an aluminum and silica composition ratio becomes about 60 through 80:about 40 through 20. Particularly, the aluminum and silica composition ratio is preferably in the range of about 70 through 74:about 30 through 26. In the case of the aluminum composition ratio of 60% or lower, a composition ratio of mullite generated by aluminum and silica becomes small. Therefore, the specific thermal conductivity of a completed mat material is likely to become high.

Next, an organic polymer such as polyvinyl alcohol is added to the precursors of the alumina-based fibers. Then, the liquid is concentrated to prepare a spinning liquid. Moreover, the spinning liquid is spun by a blowing method.

The blowing method is a method of performing the spinning operation using an airflow blown from an air nozzle and a spinning liquid flow extruded from a spinning liquid supply nozzle. The gas flow rate per slit from the air nozzle is normally in the range of about 40 through about 200 m/s. Furthermore, the diameter of the spinning nozzle is normally in the range of about 0.1 through about 0.5 mm. The liquid ounce per spinning liquid supply nozzle is normally in the range of about 1 through 120 ml/h, but it is preferably in the range of about 3 through about 50 ml/h. Under such conditions, the spinning liquid extruded from the spinning liquid supply nozzle is sufficiently drawn without becoming a spray (mist) and fibers are not easily fused together. Therefore, with the optimized spinning conditions, it is possible to provide a uniform aluminum fiber precursor having a narrow fiber diameter distribution.

An average fiber length of the alumina-based fibers manufactured here is preferably about 250 μm or larger and more preferably about 500 μm or larger. This is because the average fiber length of 250 μm or larger results in a sufficient tangle of the fibers and adequate strength. Furthermore, an average diameter of inorganic fibers is not particularly limited, but it is preferably in the range of about 3 μm through 8 μm and more preferably in the range of about 5 μm through 7 μm.

The precursors having completed the spinning operation are laminated together to manufacture a laminate sheet. In addition, a needling operation is applied to the laminate sheet. The needling operation is an operation of punching a sheet with needles so as to make the sheet thin. In the needling operation, a needling apparatus is generally used.

The needling apparatus is generally composed of a needle board capable of reciprocating in a punching direction (normally, an up-and-down direction) and a pair of supporting plates placed on both sides of the front and rear surfaces of the laminate sheet. On the needle board are provided a multiplicity of needles for punching the laminate sheet in the density of, e.g., about 25 through 5000 pieces/100 cm$^2$. Furthermore, on each supporting plate are provided a multiplicity of through-holes for the needles. Accordingly, the needle board is caused to move close to or away from the laminate sheet with the laminate sheet held from both its surfaces by the pair of supporting plates so as to make the needles punch into the laminate sheet, thereby providing a multiplicity of confounding points formed by tangling fibers.

As an alternate configuration, the needling apparatus may include two sets of the needle boards. Each of the needle boards has its supporting plates. The two sets of the needle boards are disposed on the front and rear surfaces of the laminate sheet, respectively, and the laminate sheet is held from its both surfaces by each of the supporting plates. In one needle board, the needles are arranged so as not to be aligned with the groups of the needles of the other needle board when the needling operation is performed. Furthermore, in consideration of the arrangement of the needles of both needle boards, a multiplicity of through-holes are provided in each supporting plate so that the needles do not come in contact with the supporting plates. In order to perform the needling operation, such an apparatus may be used. That is, it may be possible that the laminate sheet is held from its both surface sides by the two sets of the supporting plates and the needling operation is performed from both sides of the laminate sheet by the two sets of the needling boards. The needling operation using this method enables processing time to be shortened.

Next, the laminate sheet subjected to the needling operation is heated from room temperature and continuously burned at a maximum temperature of about 1250° C. to provide a mat material having a prescribed coating weight (a weight per unit area).

Subsequently, in order to improve the handling property of the mat material, the mat material may be impregnated with organic binders such as a resin. However, since the organic binder used here may influence an exhaust amount of the organic constituents from the exhaust gas treatment device, the amount of the organic binder used is preferably reduced as much as possible. The content of the organic binder is in the range of about 1.0 through about 10.0 wt %.

Note that an epoxy resin, acrylic resin, rubber resin, styrene-based resin, etc., may be used as the organic binder. For example, an acrylic-based rubber (ACM), acrylic nytril-butadiene rubber (NBR), styrene-butadiene rubber (SBR), etc., are preferably used.

Next, the sheet materials having elongation anisotropy made of any of the above materials are placed on the first and second surfaces of the mat material. The sheet materials are placed on the respective surfaces such that the relationship $\theta_A/\theta_{dA} < \theta_B/\theta_{dB}$ is established as described above. The sheet materials may be the same or different from each other.

As described above, when a thermally fusible material (e.g., polyethylene) is used as the sheet material, the sheet material can be easily fixed to the surface of the mat material by a heating treatment. In addition, since an adhesive is not used in this case, the amount of the organic constituents exhausted can be further reduced when the exhaust treatment device is used at high temperatures. In the case of the sheet material containing the thermally fusible material, the sheet material is first placed on one surface of the mat material and the mat material is heated for one minute at temperatures of about 140° C. through about 270° C. under the pressure of about 10 through about 100 kPa so that the sheet material is fixed to the one surface. Then, the above or a different sheet material containing the thermally fusible material is placed on the other surface and the mat material is heated for one minute at temperatures of about 140° C. through about 270° C. under the pressure of about 10 through about 100 kPa. Accordingly, the elongation anisotropy sheet materials can be fixed to both surfaces of the mat material. However, it is also possible to fix the anisotropy sheet materials to both surfaces of the mat material at the same time.

Finally, the mat material is cut in a prescribed shape (e.g., the shape shown in FIG. 1). Note that the process of cutting the mat material may be performed before the elongation anisotropy sheet materials are placed and fixed.

Through the above processes, it is possible to provide the mat material having the elongation anisotropy sheet materials on its front and rear surfaces.

EXAMPLES

Below, a description is made of the effects according to an embodiment of the present invention based on examples.

(Manufacturing of Mat Material According to Example 1)

Silica sol is mixed in a basic aluminum chloride aqueous solution with an aluminum content of 70 g/l and Al/Cl=1.8 (atom ratio) so that the composition of alumina-based fibers becomes $Al_2O_3:SiO_2=72:28$, thereby forming the precursors of the alumina-based fibers. Then, a polyvinyl alcohol is added to the precursors of the alumina-based fibers. Moreover, the liquid is concentrated to prepare a spinning liquid, and the spinning liquid is spun by a blowing spinning method. The flow rate of carrier gas (air) is 52 m/s and the supply rate of the spinning liquid is 5.3 ml/h.

After this, the folded precursors of the alumina-based fibers are laminated together to manufacture a material sheet of the alumina-based fibers.

Next, the needling operation is applied to the material sheet. The needling operation is performed from one side of the material sheet using the needle board on which the needles are provided in the density of 80 pieces/100 cm$^2$ and which is disposed only one side of the material sheet.

Then, the obtained material mat is continuously burned for one hour from room temperature to a maximum temperature of 1250° C. After this, it is impregnated with an organic binder. An acrylic latex emulsion is used as the organic binder, and the impregnation rate is 1 wt % relative to a total amount (including the organic binder) of the material mat.

Subsequently, the thus-obtained mat material having a thickness of 9.2 mm and a basis weight of 1500 g/m² is cut in a prescribed size to provide a mat base.

Figure 8:
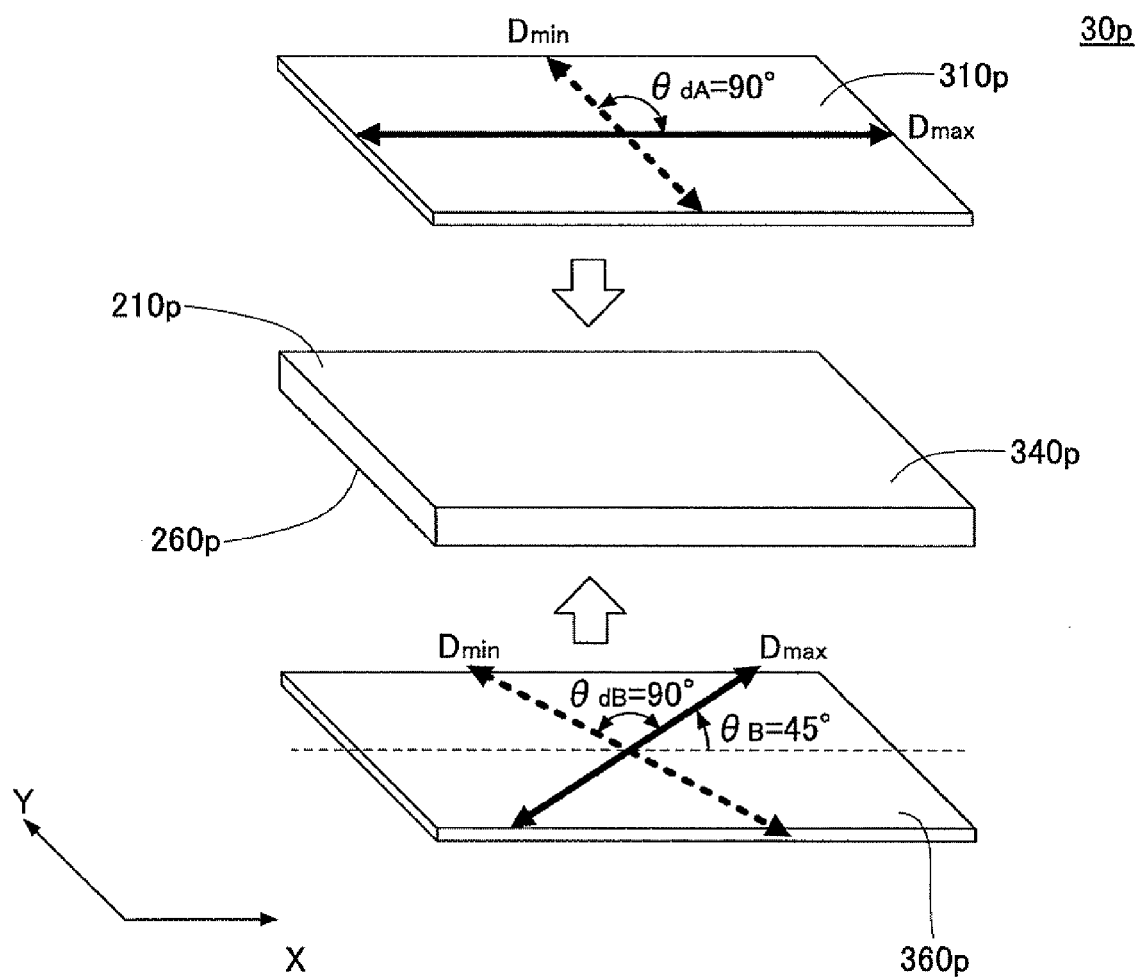
FIG. 8 is a diagram schematically showing the configuration of the mat material according to Example 1.

Next, as shown in FIG. 8, the first and second sheet materials are placed on the first and second surfaces of the mat baser respectively.

First, a sheet material 310p (polypropylene nonwoven: Eltas (Trade Mark) manufactured by ASAHI KASEI FIBERS CORPORATION) (first sheet material) having a thickness of 0.23 mm and elongation anisotropy of $\theta_d=90°$ is placed on a first surface 210p of the mat base 340p. Note that the elongation anisotropy sheet material is placed on the first surface 210p of the mat base 340p such that $\theta_A=0°$ is provided (that is, the easy-to-elongate direction $D_{max}$ becomes substantially parallel to the longitudinal direction of the mat base 340p). After this, the mat base 340p is heated for one minute at 200° C. under the pressure of about 15 kPa, thereby making the first sheet material 310p thermally fused with the first surface 210p of the mat base.

In the same manner, the same sheet material (second sheet material 360p) is thermally fused with a second surface 260p of the mat base 340p. However, the elongation anisotropy sheet material 360p is placed on the second surface 260p of the mat base 340p such that $\theta_B=45°$ is provided. The mat material 30p thus obtained is used as the mat material of Example 1.

Examples 2 Through 5

Figure 9:
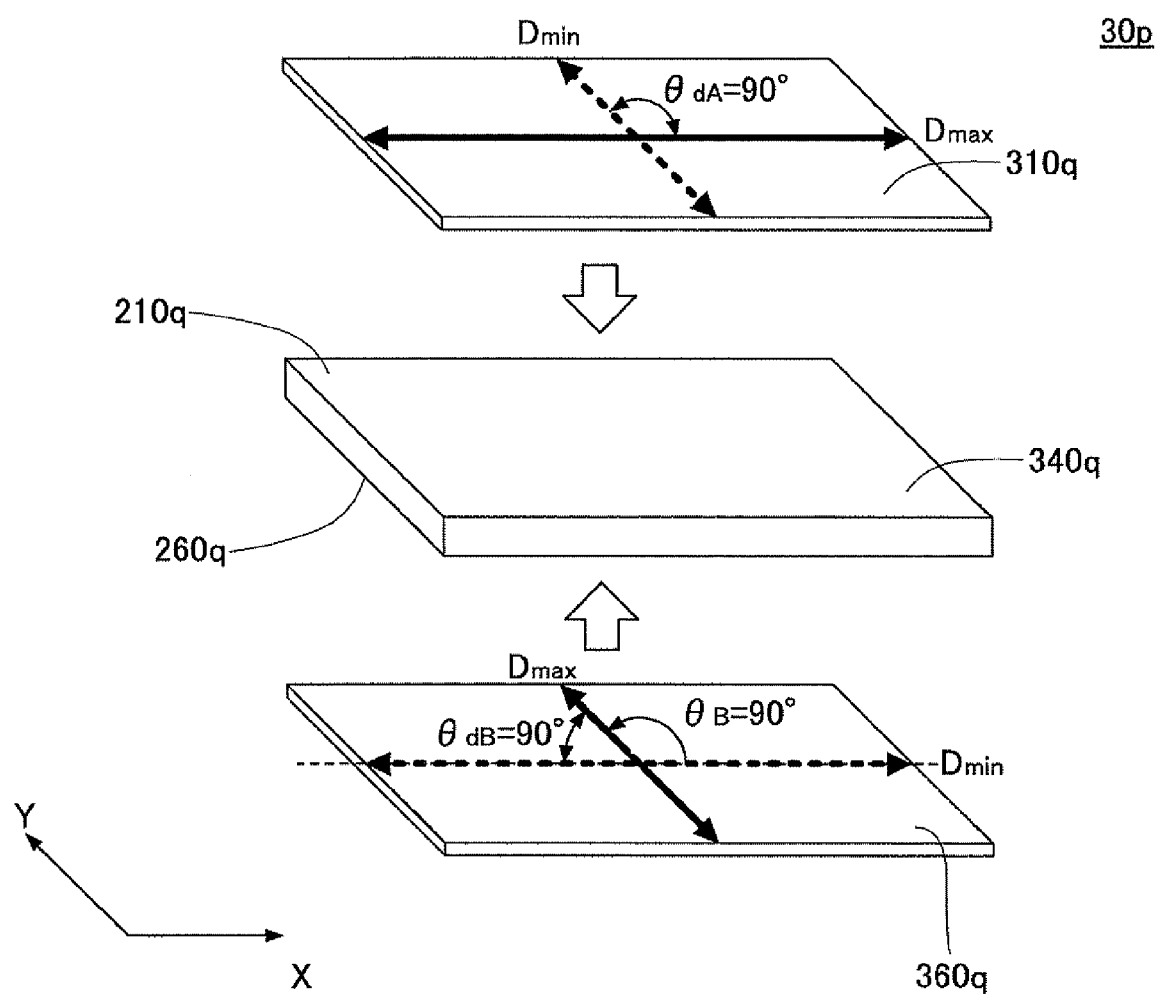
FIG. 9 is a diagram schematically showing the configuration of the mat material according to Example 2.
Figure 10:
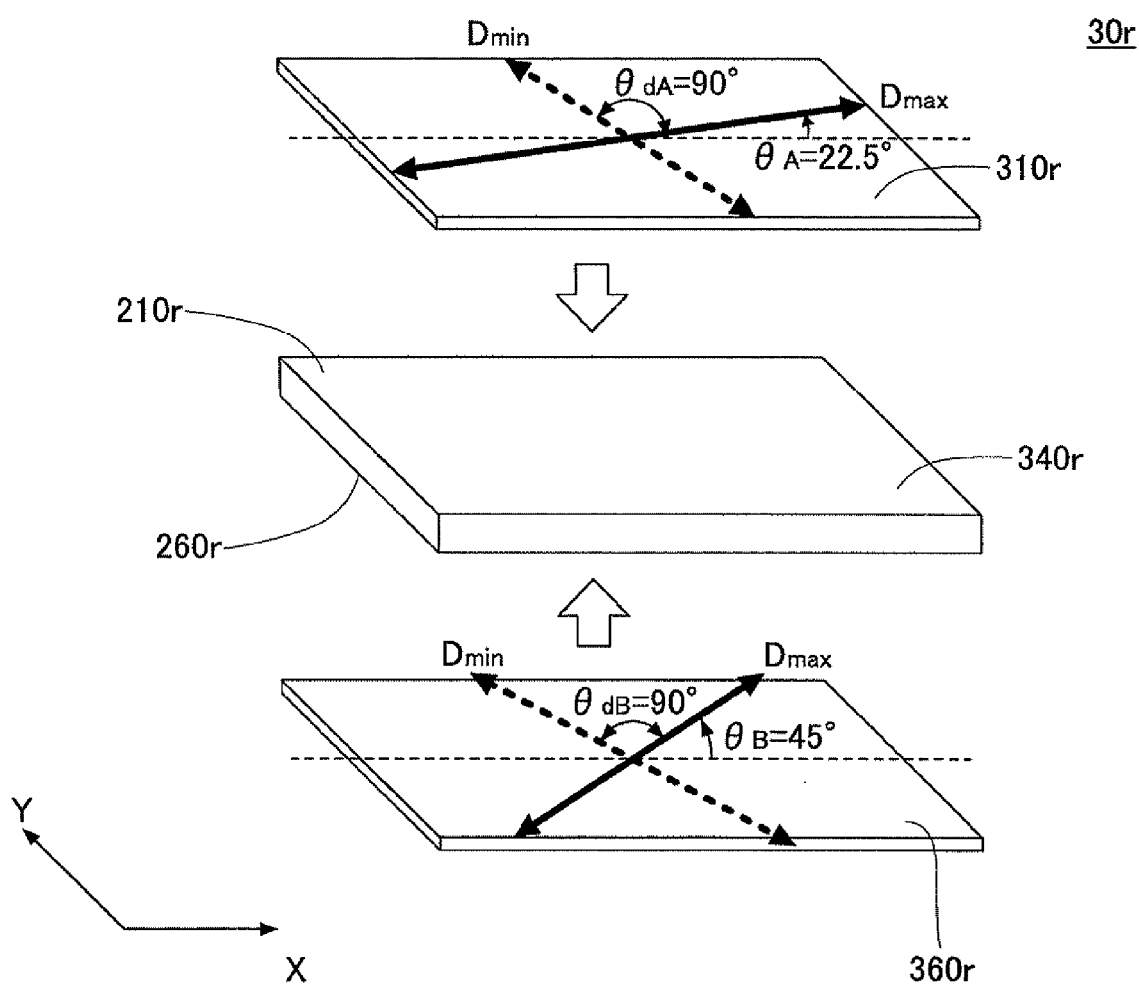
FIG. 10 is a diagram schematically showing the configuration of the mat material according to Example 3.

In the same manner as Example 1, the mat material having the elongation anisotropy sheet materials on its both surfaces is manufactured (Examples 2 through 5). Note, however, that Example 2 provides $\theta_A=0°$ and $\theta_B=90°$ as shown in FIG. 9, Example 3 provides $\theta_A=22.5°$ and $\theta_B 90°$ as shown in FIG. 10, Example 4 provides $\theta_A=22.5°$ and $\theta_B=90°$, and Example 5 provides $\theta_A=45°$ and $\theta_B=90°$.

Example 6

In the same manner as Example 1, the mat material having the elongation anisotropy sheet materials on its both surfaces is manufactured. Note, however, that Example 6 uses as the first and second sheet materials the sheet materials (made of polyethylene: CLAF (Trade Mark) manufactured by NISSEKI PLASTO Co., LTD.) having a thickness of 0.080 mm and $\theta_d=45°$. Furthermore, the sheet materials are heated for one minute at 150° C. under the pressure of about 15 kPa so as to be thermally fused with the first and second surfaces of the mat base. Note that the mat material provides $\theta_A=0°$ and $\theta_B=22.5°$.

Examples 7 Through 10

In the same manner as Example 6, the mat material having the elongation anisotropy sheet materials on its both surfaces is manufactured (Examples 7 through 10). Note, however, that Example 7 provides $\theta_A=0°$ and $\theta_B=45°$, Example 8 provides $\theta_A=15°$ and $\theta_B=22.5°$, Example 9 provides $\theta_A=15°$ and $\theta_B=45°$, and Example 10 provides $\theta_A=22.5°$ and $\theta_B=45°$.

Comparative Example 1

In the same manner as Example 1, the mat material is manufactured. Note, however, that, in Comparative Example 1, resin films having a thickness of 0.026 mm and no elongation anisotropy (i.e., resin films having isotropy) (manufactured by PANAC corporation) are placed on the first and second surfaces of the mat base. The resin films are heated for one minute at 160° C. under the pressure of about 15 kPa so as to be thermally fused with both surfaces of the mat base.

Comparative Examples 2 Through 7

In the same manner as Example 1, the mat material having the elongation anisotropy sheet materials on its both surfaces is manufactured (Comparative Examples 2 through 8). Note, however, that Comparative Example 2 provides $\theta_A=0°$ and $\theta_B=0°$, Comparative Example 3 provides $\theta_A=45°$ and $\theta_B=0°$, Comparative Example 4 provides $\theta_A=45°$ and $\theta_B=45°$, Comparative Example 5 provides $\theta_A=90°$ and $\theta_B=0°$, Comparative Example 6 provides $\theta_A=90°$ and $\theta_B=45°$, and Comparative Example 7 provides $\theta_A=90°$ and $\theta_B=90°$.

Table 1 shows the summary of the respective values of $\theta_{dA}$, $\theta_{dB}$ ($=\theta_{dA}$), $\theta_A$, $\theta_B$, and $\theta_{dif}$ of the first and second sheet materials in the mat material according to the above Examples and Comparative Examples.

TABLE 1

| SAMPLES | DIFFERENCE $\theta_{dA}(°)$ BETWEEN $D_{max}$ AND $D_{min}$ OF FIRST SHEET MATERIAL | DIFFERENCE $\theta_{dB}(°)$ BETWEEN $D_{max}$ AND $D_{min}$ OF SECOND SHEET MATERIAL | ANGLE $\theta_A(°)$ FORMED BY LONGITUDINAL DIRECTION OF MAT MATERIAL AND $D_{max}$ OF FIRST SHEET MATERIAL | ANGLE $\theta_B(°)$ FORMED BY LONGITUDINAL DIRECTION OF MAT MATERIAL AND $D_{max}$ OF SECOND SHEET MATERIAL | STANDARDIZED ANGULAR DIFFERENCE $\theta_{dif}$ (= $(\theta_B/\theta_{dB})$ − $(\theta_A/\theta_{dA})$) | BENDING STRENGTH (N) | STANDARD DEVIATION OF FITTING GAP S (mm) |
|---|---|---|---|---|---|---|---|
| EXAMPLE 1 | 90 | 90 | 0 | 45 | 0.50 | 2.85 | 0.159 |
| EXAMPLE 2 | 90 | 90 | 0 | 90 | 1.00 | 2.62 | 0.132 |
| EXAMPLE 3 | 90 | 90 | 22.5 | 45 | 0.25 | 2.89 | 0.186 |
| EXAMPLE 4 | 90 | 90 | 22.5 | 90 | 0.75 | 3.04 | 0.154 |
| EXAMPLE 5 | 90 | 90 | 45 | 90 | 0.50 | 3.21 | 0.129 |
| EXAMPLE 6 | 45 | 45 | 0 | 22.5 | 0.50 | 2.31 | 0.150 |
| EXAMPLE 7 | 45 | 45 | 0 | 45 | 1.00 | 2.10 | 0.108 |
| EXAMPLE 8 | 45 | 45 | 15 | 22.5 | 0.17 | 2.44 | 0.170 |
| EXAMPLE 9 | 45 | 45 | 15 | 45 | 0.67 | 2.51 | 0.108 |
| EXAMPLE 10 | 45 | 45 | 22.5 | 45 | 0.50 | 2.93 | 0.125 |
| COMPARATIVE EXAMPLE 1 | 0 | 0 | — | — | — | 4.21 | 0.234 |
| COMPARATIVE EXAMPLE 2 | 90 | 90 | 0 | 0 | 0 | 2.70 | 0.224 |
| COMPARATIVE EXAMPLE 3 | 90 | 90 | 45 | 0 | −0.50 | 3.49 | 0.191 |
| COMPARATIVE | 90 | 90 | 45 | 45 | 0 | 3.41 | 0.165 |

TABLE 1-continued

| SAMPLES | DIFFERENCE $\theta_{dA}(°)$ BETWEEN $D_{max}$ AND $D_{min}$ OF FIRST SHEET MATERIAL | DIFFERENCE $\theta_{dB}(°)$ BETWEEN $D_{max}$ AND $D_{min}$ OF SECOND SHEET MATERIAL | ANGLE $\theta_A(°)$ FORMED BY LONGITUDINAL DIRECTION OF MAT MATERIAL AND $D_{max}$ OF FIRST SHEET MATERIAL | ANGLE $\theta_B(°)$ FORMED BY LONGITUDINAL DIRECTION OF MAT MATERIAL AND $D_{max}$ OF SECOND SHEET MATERIAL | STANDARDIZED ANGULAR DIFFERENCE $\theta_{dif}$ (= $(\theta_B/\theta_{dB})$ − $(\theta_A/\theta_{dA})$) | BENDING STRENGTH (N) | STANDARD DEVIATION OF FITTING GAP S (mm) |
|---|---|---|---|---|---|---|---|
| EXAMPLE 4 | | | | | | | |
| COMPARATIVE EXAMPLE 5 | 90 | 90 | 90 | 0 | −1.00 | 3.49 | 0.195 |
| COMPARATIVE EXAMPLE 6 | 90 | 90 | 90 | 45 | −0.50 | 3.62 | 0.173 |
| COMPARATIVE EXAMPLE 7 | 90 | 90 | 90 | 90 | 0 | 3.71 | 0.132 |

The respective mat materials manufactured in the above manners are used as test samples and subjected to a bending test. The bending test adopts a three-point bending test and is conducted in the following manner.

First, the respective mat materials as the test samples (100 mm in width×300 mm in length) are placed on a test jig with its first surface (first sheet material) oriented downward. The distance between supporting points at both ends of the test jig is 150 mm. Then, a load body having a diameter size of 30 mm×150 mm is pressed to the center areas in the longitudinal and width directions of the mat material from its top side (i.e., the side in the second sheet material) at a compression rate of 10 mm/min. In this situation, a load is gradually applied to the thickness direction of the mat material, and the maximum load (unit: N) obtained during this period is measured.

(Measurement of Fitting Part Gap)

The measurement of a fitting part gap as described below is performed using the respective mat materials manufactured in the above manners.

Figure 11:
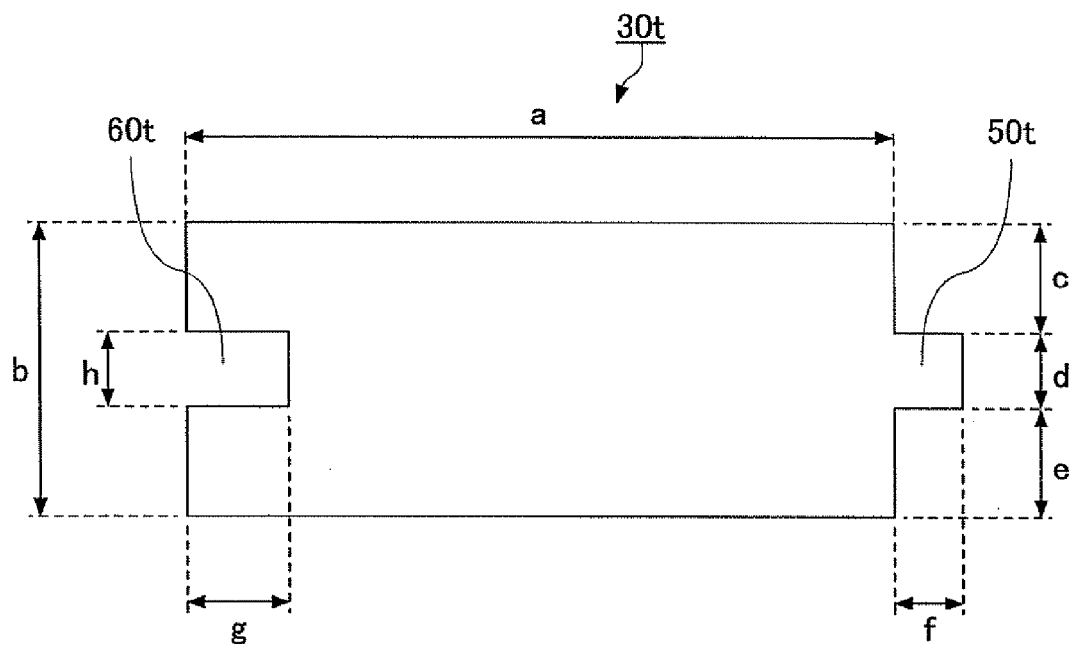
FIG. 11 is a diagram showing the shape of a sample for measuring a fitting part gap.
Figure 12:
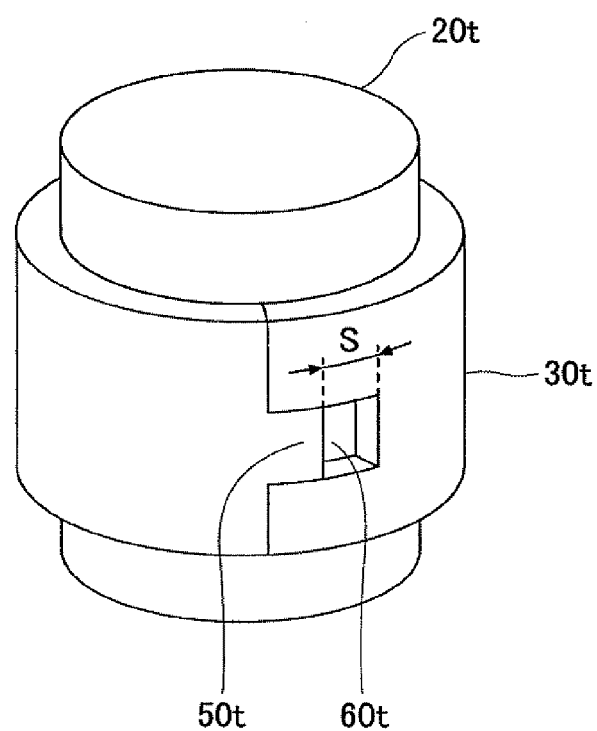
FIG. 12 is a diagram schematically showing a fitting gap S generated when the fitting part gap is measured.

The respective mat materials as the test samples manufactured in the above manners are cut in a shape as shown in FIG. 11 to form test samples 30t. The sizes of respective areas are as follows. That is, the test samples 30t have the sizes of a 262 mm, b=83.5 mm, c=28 mm, d=27.5 mm, e=28 mm, f=35 mm, g=35 mm, and h=27.5 mm. Then, the test samples 30t are wound around a metal cylinder 20t having a diameter of 80 mm and a total length of 120 mm with the first sheet material positioned on the outside so that a fitting concave part 60t and a fitting convex part 50t are fitted together. At this time, a fitting gap S generated in a fitting part as shown in FIG. 12 is measured. This measurement operation is repeatedly performed five times, and the standard deviation of the fitting gap S is determined from the obtained results.

(Test Results)

Table 1 shows the results of the bending test (the values of maximum loads) and the measurement of the fitting part gap (the standard deviations) obtained from the samples.

Figure 13:
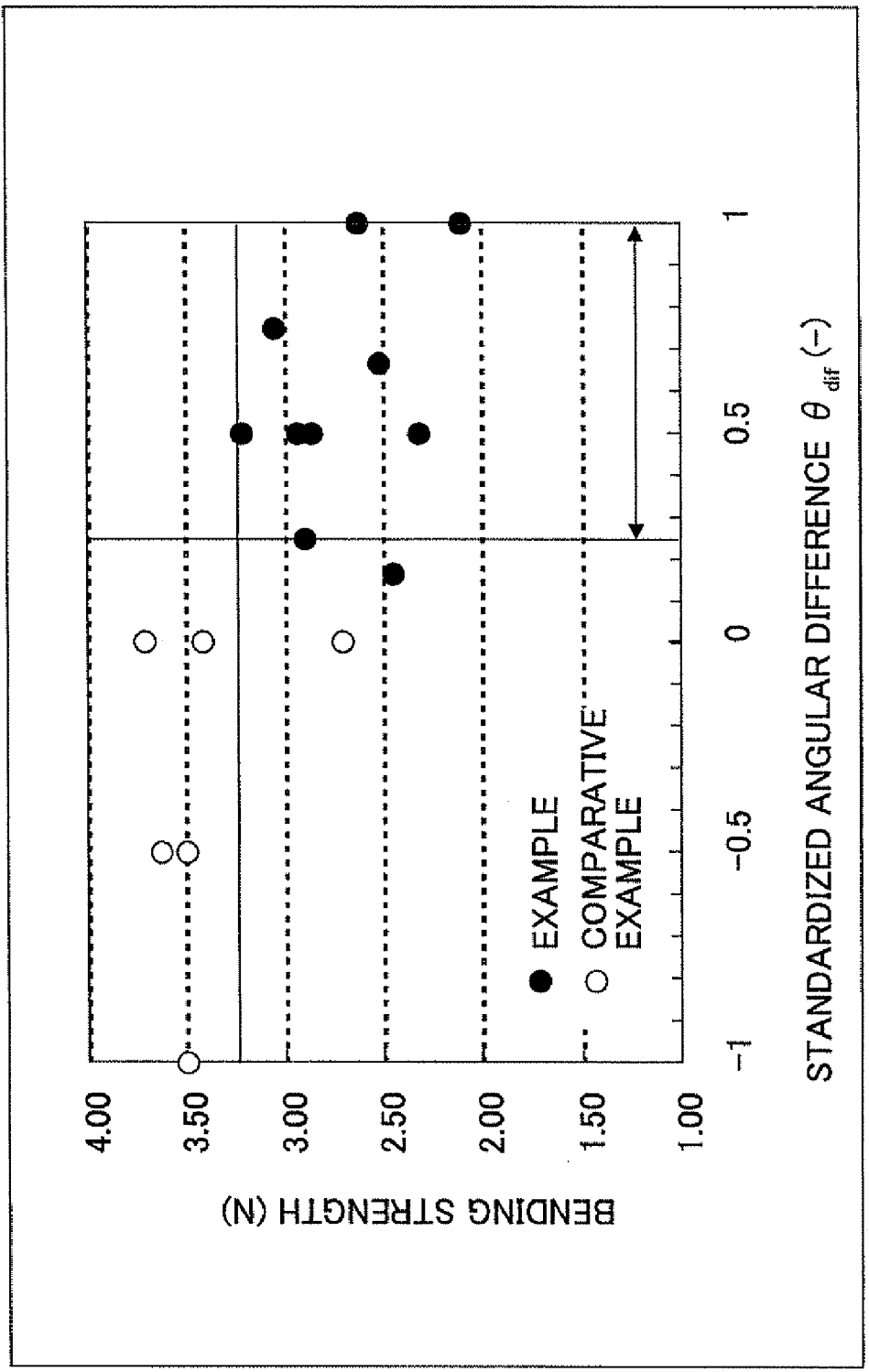
FIG. 13 is a diagram showing a relationship between a standardized angular difference $\theta_{dif}$ and a bending strength in respective mat materials.
Figure 14:
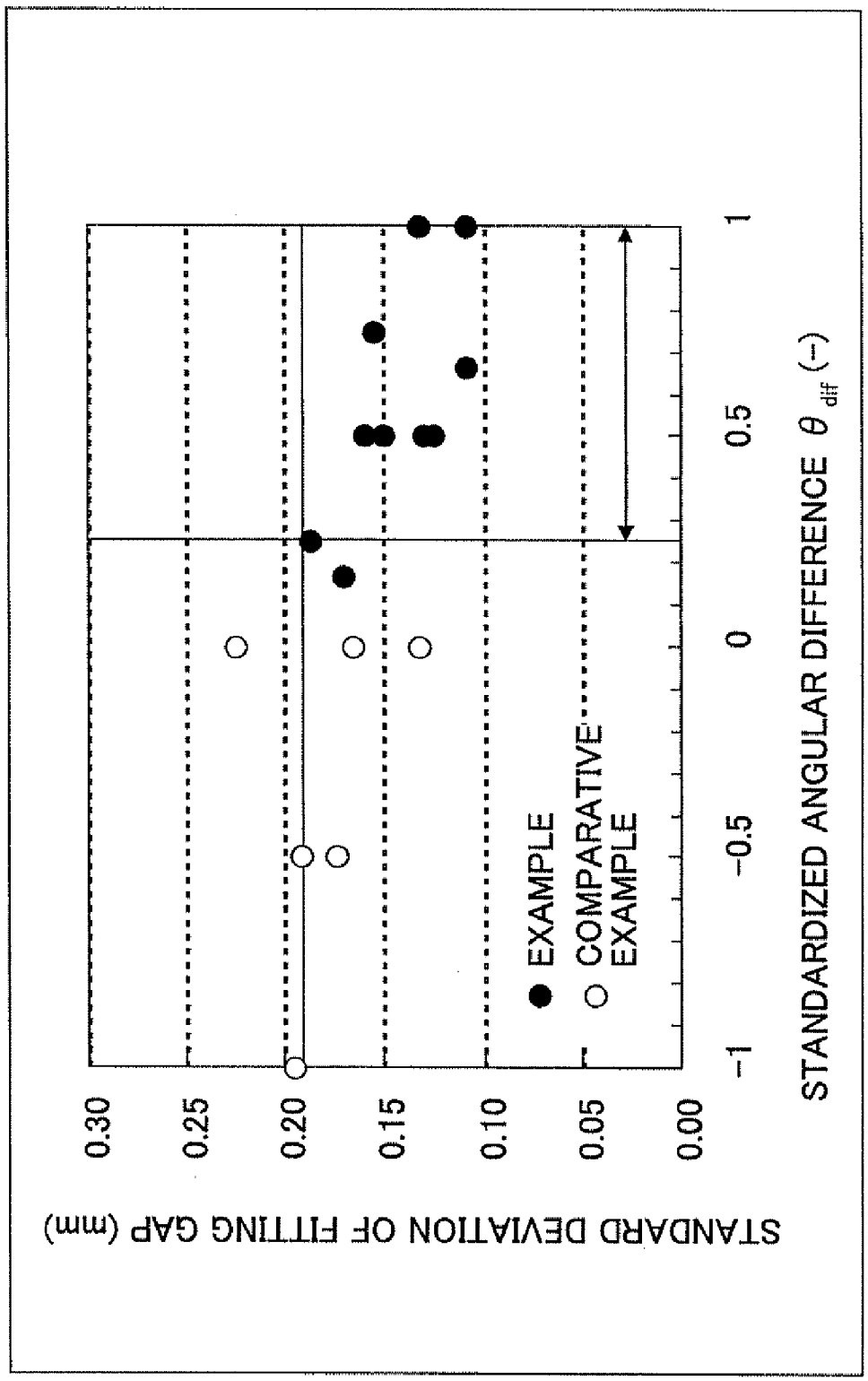
FIG. 14 is a diagram showing a relationship between a standardized angular difference $\theta_{dif}$ and a standard deviation of a fitting gap in the respective mat materials.

Furthermore, FIGS. 13 and 14 respectively show the relationships between the standardized angular difference $\theta_{dif}$ and the bending strength and between the standardized angular difference $\theta_{dif}$ and the standard deviation of the fitting gap in the respective samples. Moreover, FIGS. 15 and 16 respectively show the relationship between the angle $\theta_A$ and the bending strength under the conditions of $\theta_{dA}=\theta_{dB}=90°$ (Examples 1 through 5) and $\theta_{dA}=\theta_{dB}=45°$ (Examples 6 through 10).

It is clear from Table 1 that the standard deviation of the fitting gap and the bending strength in the mat materials (Examples 1 through 10) having the anisotropy sheet materials on both their surfaces according to the embodiment of the present invention are significantly reduced compared with the mat material of Comparative Example 1 having the sheet materials with no anisotropy on both its surfaces.

Furthermore, it is clear from Examples 1 through 5 and Comparative Examples 2 through 7 in Table 1 that at least any of the standard deviations of the fitting gap and the bending strength in the mat material having the relationship $\theta_{dif}>0$, i.e., $\theta_A/\theta_{dA} \leq \theta_B/\theta_{dB}$ is significantly reduced compared with the mat material having the relationship $\theta_{dif} \leq 0$, i.e., $\theta_A/\theta_{dA} \geq \theta_B/\theta_{dB}$.

Furthermore, the results of FIGS. 13 and 14 show that the bending strength becomes 3.25 N or smaller and the standard deviation of the fitting gap becomes 0.19 mm or smaller if the standardized angular difference $\theta_{dif}$ is in the range of $0.25 < \theta_{dif} \leq 1$. It is clear from this result that the bending strength and the standard deviation of the fitting gap are further reduced if the standardized angular difference $\theta_{dif}$ is in this range. Particularly, if the angular difference $\theta_{dif}$ is in the range of $0.50 < \theta_{dif} \leq 1$, the standard deviation of the fitting gap is significantly reduced.

Figure 15:
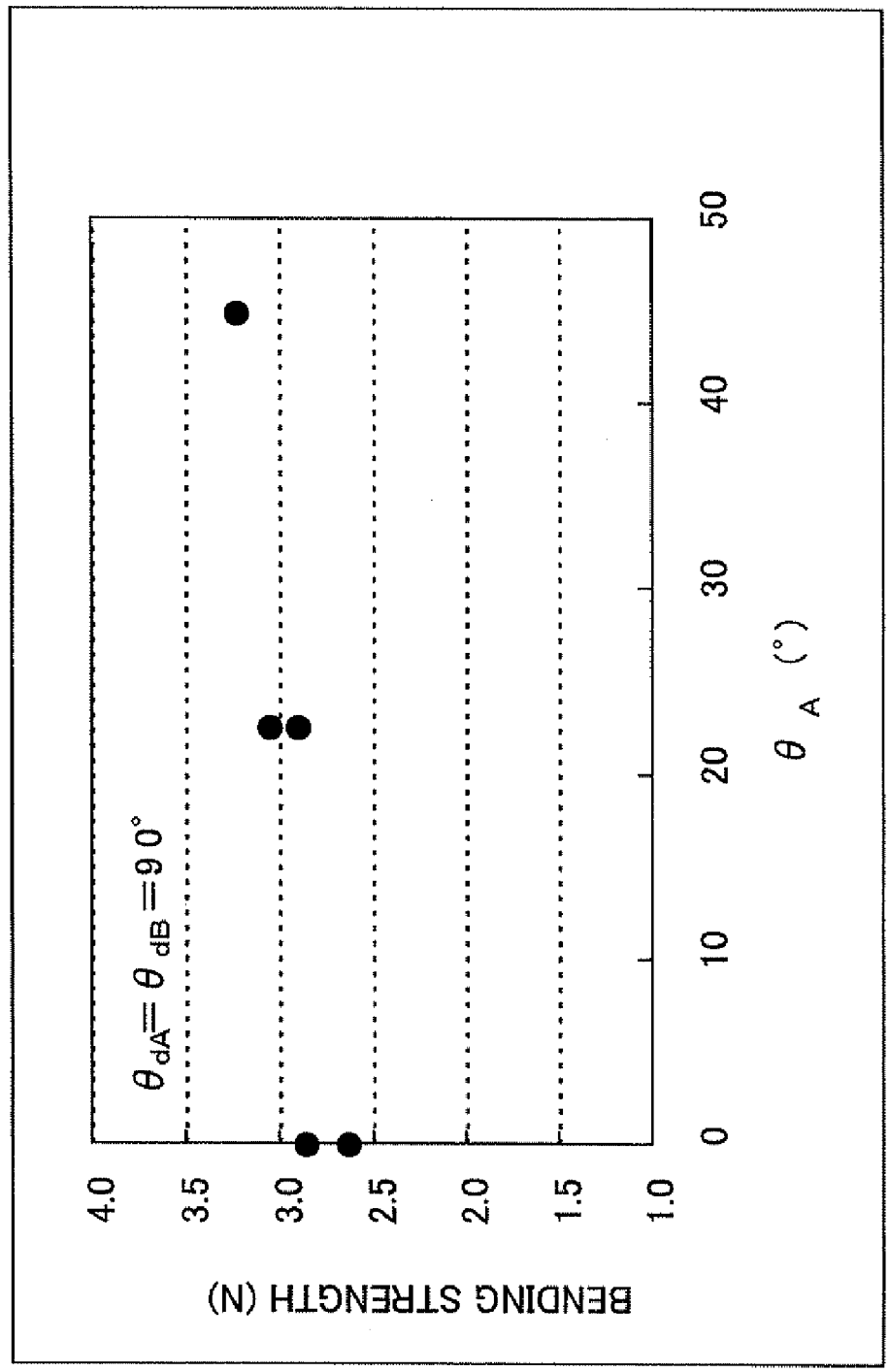
FIG. 15 is a diagram showing a relationship between an angle $\theta_A$ and the bending strength under $\theta_{dA}=\theta_{dB}=90°$.
Figure 16:
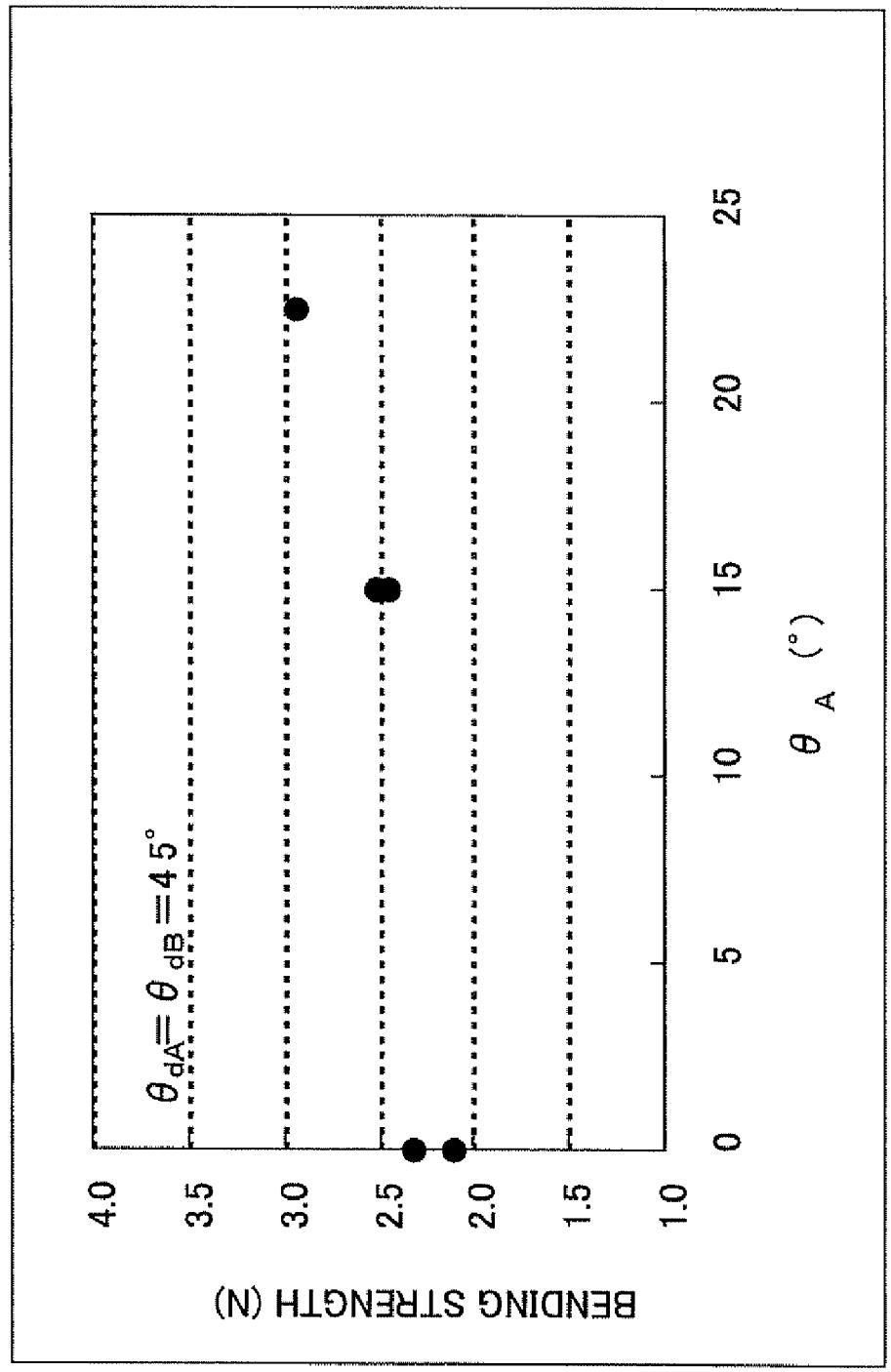
FIG. 16 is a diagram showing a relationship between the angle $\theta_A$ and the bending strength under $\theta_{dA}=\theta_{dB}=45°$.

Moreover, it is clear from the results of FIGS. 15 and 16 that the bending strength of the mat material can be minimized by providing $\theta_A=0°$ even where $\theta_{dA}=\theta_{dA}=90$ and $\theta_{dA}=\theta_{dA}=90°$ are provided. When the mat material having such a small bending strength is wound around the exhaust gas treatment body with the first surface (first sheet material) positioned on the outside, its winding property can be further improved.

The mat material and the exhaust gas treatment device according to the embodiment of the present invention can be applied to an exhaust gas treatment device for an automobile or the like.

The present invention is not limited to the specifically disclosed embodiment, and variations and modifications may be made without departing from the scope of the present invention.

What is claimed is:

1. A mat material comprising:
   a mat base comprising an inorganic fiber and having a first surface and a second surface opposite to the first surface;
   a first sheet material provided on the first surface of the mat base to alleviate scattering of the inorganic fiber contained in the inorganic fiber mat base;
   a second sheet material provided on a second surface of the mat base to alleviate scattering of the inorganic fiber contained in the inorganic fiber mat base;
   the first and second sheet materials having elongation anisotropy in planes of the first and second surfaces, respectively; and a relationship $\theta_A/\theta_{dA} < \theta_B/\theta_{dB}$ being satisfied between an angle $\theta_A$ (about $0 \leq \theta_A \leq \theta_{dA}$) formed by an easy-to-elongate direction in the first sheet material relative to a longitudinal direction of the mat material and an angle $\theta_B$ (about $0 \leq \theta_B \leq \theta_{dB}$) formed by an easy-to-elongate direction in the second sheet material relative to the longitudinal direction of the mat material, wherein a direction in which a value at about a 5% nominal strain represented by (a tensile load (N)/a nominal strain) in the planes of the sheet materials becomes minimum is defined as the easy-to-elongate direction and a direction in which the value becomes maximum is defined as a hard-to-elongate direction, and wherein an angle formed by the easy-to-elongate direction and the hard-to-elongate direction in the first sheet material is $\theta_{dA}$ (about $0 < \theta_{dA} \leq$ about 90°) and an angle formed by the easy-to-elongate direction and the hard-to-elongate direction in the second sheet material is $\theta_{dB}$ (about $0 < \theta_{dB} \leq$ about 90°).

2. The mat material according to claim 1, wherein a standardized angular difference $\theta_{dif}$ represented by $\theta_{dif} = (\theta_B/\theta_{dB})(\theta_A/\theta_{dA})$ is in a range of about $0.25 < \theta_{dif} <$ about 1.

3. The mat material according to claim 1, wherein the angle $\theta_A$ is substantially about zero.

4. The mat material according to claim 1, wherein the angle $\theta_{dA}$ in the first sheet material is about 90° or about 45°.

5. The mat material according to claim 1, wherein the angle $\theta_{dA}$ is substantially equal to the angle $\theta_{dB}$.

6. The mat material according to claim 1, wherein the first and second sheet materials are same sheet materials.

7. The mat material according to claim 1,
wherein the first sheet material is placed on a substantially entire area of the first surface of the mat material, and/or
wherein the second sheet material is placed on a substantially entire area of the second surface of the mat material.

8. The mat material according to claim 1,
wherein at least one of the first and second sheet materials is formed from at least one of polyethylene, polypropylene and polyethylene terephthalate.

9. The mat material according to claim 1, further comprising:
an inorganic binder and/or an organic binder.

10. An exhaust gas treatment device comprising:
an exhaust gas treatment body having first and second opening surfaces through which exhaust gas passes;
a holding seal material wound around at least a part of an outer peripheral surface other than the first and second opening surfaces of the exhaust gas treatment body, the holding seal material comprising a mat material comprising:
an inorganic fiber mat base;
a first sheet material provided on a first surface of the mat base to alleviate scattering of an inorganic fiber contained in the inorganic fiber mat base;
a second sheet material provided on a second surface of the mat base to alleviate scattering of the inorganic fiber contained in the inorganic fiber mat base;
the first and second sheet materials having elongation anisotropy in planes of the first and second surfaces, respectively; and
a relationship $\theta_A/\theta_{dA} < \theta_B/\theta_{dB}$ being satisfied between an angle $\theta_A$ (about $0 \leq \theta_A \leq \theta_{dA}$) formed by an easy-to-elongate direction in the first sheet material relative to a longitudinal direction of the mat material and an angle $\theta_B$ (about $0 \leq \theta_B \leq \theta_{dB}$) formed by an easy-to-elongate direction in the second sheet material relative to the longitudinal direction of the mat material,
wherein a direction in which a value at about a 5% nominal strain represented by (a tensile load (N)/a nominal strain) in the planes of the sheet materials becomes minimum is defined as the easy-to-elongate direction and a direction in which the value becomes maximum is defined as a hard-to-elongate direction, and
wherein an angle formed by the easy-to-elongate direction and the hard-to-elongate direction in the first sheet material is $\theta_{dA}$ (about $0 < \theta_{dA} \leq$ about 90°) and an angle formed by the easy-to-elongate direction and the hard-to-elongate direction in the second sheet material is $\theta_{dB}$ (about $0 < \theta_{dB} \leq$ about 90°); and
the holding seal material being wound around the exhaust gas treatment body such that the second surface comes into contact with the outer peripheral surface of the exhaust gas treatment body.

11. The exhaust gas treatment device according to claim 10, wherein the exhaust gas treatment body is a catalyst carrier or an exhaust gas filter.

12. The mat material according to claim 1, wherein the sheet material includes one of a paper material and a nonwoven material.

13. The mat material according to claim 1, wherein the sheet material includes one of a paper material and a nonwoven material.

14. The exhaust gas treatment device according to claim 10, wherein the sheet material includes one of a paper material and a nonwoven material.

* * * * *